(12) United States Patent
Epaud

(10) Patent No.: US 7,040,704 B2
(45) Date of Patent: May 9, 2006

(54) FOLDABLE SEAT SYSTEM COMPRISING SEAT BELT BUCKLES

(75) Inventor: David Epaud, Cerny (FR)

(73) Assignee: Faurecia Sieges D'Automobile, (FR)

( * ) Notice: Subject to any disclaimer, the term of this patent is extended or adjusted under 35 U.S.C. 154(b) by 0 days.

(21) Appl. No.: 11/109,962

(22) Filed: Apr. 19, 2005

(65) Prior Publication Data

US 2005/0248199 A1 Nov. 10, 2005

(30) Foreign Application Priority Data

Apr. 21, 2004 (FR) .................................. 04 04214

(51) Int. Cl.
B60N 2/02 (2006.01)

(52) U.S. Cl. ................................. 297/378.1

(58) Field of Classification Search ............. 297/378.1, 297/464, 341, 248, 257; 280/801.1; 296/65.09
See application file for complete search history.

(56) References Cited

U.S. PATENT DOCUMENTS

| | | | |
|---|---|---|---|
| 4,133,556 A | | 1/1979 | Glinski |
| 4,451,087 A | * | 5/1984 | Tamamushi .................. 297/468 |
| 4,480,713 A | * | 11/1984 | Macht et al. ................ 180/268 |
| 4,923,214 A | * | 5/1990 | Siegrist et al. .............. 280/806 |
| 5,332,261 A | | 7/1994 | Siepierski |
| 6,467,849 B1 | * | 10/2002 | Deptolla ..................... 297/464 |
| 6,517,157 B1 | * | 2/2003 | Vorac ..................... 297/344.13 |
| 6,582,003 B1 | * | 6/2003 | Fourrey et al. ................ 296/64 |
| 2002/0050707 A1 | | 5/2002 | Nishide |

FOREIGN PATENT DOCUMENTS

| | | |
|---|---|---|
| DE | 38 07 927 A1 | 9/1989 |
| EP | 0 004 485 A1 | 10/1979 |
| FR | 2 844 491 | 3/2004 |
| GB | 2 271 054 A | 4/1994 |
| JP | 62085745 | 4/1987 |
| JP | 02095953 | 4/1990 |
| JP | 2002120690 | 4/2002 |

* cited by examiner

Primary Examiner—Milton Nelson, Jr.
(74) Attorney, Agent, or Firm—Bachman & LaPointe, P.C.

(57) ABSTRACT

A seat system includes two backrests installed so as to pivot around a backrest axis in relation to a floor between a raised position and a folded down position, and a first belt locking buckle installed so as to pivot in order to retract, first connecting system between a first backrest and the first buckle so that the pivoting of the first backrest causes the first buckle to pivot between a high position and a retracted position, a second belt locking buckle aligned with the first buckle in a plane perpendicular to the backrest axis, the second buckle being connected to the second backrest by a second connecting system in such a manner that the first buckle pivots in a first direction when the first backrest is pivoted from the raised position to the retracted position, and the second buckle pivots in a second direction opposite to the first direction when the second backrest is pivoted from the raised position to the folded down position.

4 Claims, 4 Drawing Sheets

FOLDABLE SEAT SYSTEM COMPRISING SEAT BELT BUCKLES

BACKGROUND OF THE INVENTION (1) Field of the Invention

The present invention relates to a foldable seat system comprising seat belt buckles.

(2) Prior Art

The seat belts in automobile vehicles intended to maintain a passenger on a seat comprise anchoring points one of which is detachable. The detachable anchoring point is formed by a seat belt buckle intended to accommodate a ring. The buckle is often directly connected to the structure of the vehicle or, sometimes, to the framework of a seat.

Vehicles are sometimes equipped with foldable seats in two parts, separated along a longitudinal and vertical separation plane. Each part of the seat comprises a seat pan installed so as to pivot forwards and onto the floor and a backrest installed so as to pivot also onto the floor at the bottom. To enable the folding of the backrest, the buckle is connected to the floor by means of a flexible strap. Thus, the buckle is placed on the floor before the backrest is folded down on top of it. However, when the seat is returned to its utilisation position, the user must manually return the buckle to a position accessible by the passengers.

Moreover, certain foldable seats comprise a seat pan installed so as to pivot, on the one hand, on the backrest and, on the other hand, on two parallel seat pan links. The links are installed so as to pivot on the floor so that the seat pan moves towards the floor when the backrest is placed in folded position. In this case, the buckle cannot be placed on the floor. If the buckle is fixed, there is a risk that it will protrude above the rear face of the backrest when the backrest is folded down. In this case, clearance must also be provided in the backrest for the buckle.

Document JP-A-2-95953 relates to a seat system comprising a foldable backrest and a buckle support supporting two belt buckles and installed so as to pivot in relation to the floor of the vehicle. Connecting means connect the buckle support to the backrest in such a way that the pivoting of the backrest causes the buckles to pivot between a high position, in which the buckles are above the seat pan, and a retracted position, in which the buckles are housed in a cavity of the seat pan. However, the two buckles side by side are bulky and can hinder the two occupants of the seat sat on either side of the buckles.

SUMMARY OF THE INVENTION

It is an object of the present invention to provide a seat system comprising a foldable backrest in two parts and safety belt buckles which remain easily accessible after the raising of the backrest and which do not intrude into the backrest or into the passenger compartment when the backrest is folded down. It is also an object to limit the overall width of the buckles.

With these targets in mind, the subject of the invention is a seat system comprising a first backrest intended to be installed so as to pivot around an axis of the backrest in relation to a floor between a raised position and a folded down position, and a first buckle support supporting a first belt locking buckle and installed so as to pivot to retract the first buckle, the system comprising first connecting means between the first backrest and the first buckle support so that the pivoting of the first backrest causes the first buckle to pivot between a high position and a retracted position. The system also comprises a second backrest installed so as to pivot around the same backrest axis and with a raised position in which it is more or less coplanar with the first backrest, a second buckle support supporting a second belt locking buckle aligned with the first buckle in a plane perpendicular to the axis of the backrest, the second buckle support being connected to the second backrest by second connecting means in such a way that the first buckle pivots in a first direction when the first backrest pivots from the raised position to the folded down position, and the second buckle pivots in a second direction opposite to the first direction when the second backrest pivots from the raised position to the folded down position.

This system concerns a row of seats in two parts placed side by side. The two buckles are aligned to reduce their overall size crosswise and to leave more space for the passengers. They pivot in opposite directions to avoid interference in their movements and thus allow one backrest to be folded down independently of the other one. When the backrests are folded down the buckles take up positions not troublesome for the backrests without protruding into the passenger compartment and, when the backrests are raised, the buckles return to their raised positions where they are easily accessible by the passengers. Also, the backrests remain manoeuvrable independently of each other.

In a specific manner, the connecting means comprise a backrest lever attached to the backrest, a buckle lever attached to the buckle and a buckle link connecting the backrest and buckle levers together. The levers extend from the pivoting axis of the part to a pivoting axis of the link on the lever. Thus, the pivoting movement of a backrest is transmitted in a very simple and direct manner to the associated buckle causing it to pivot.

Preferably, the first buckle is located further forward than the second buckle, the backrest levers being directed downwards, the first buckle lever, the first buckle link and the first backrest lever of the first connecting means forming a U, the second buckle lever, the second buckle link and the second backrest lever of the second connecting means forming a Z. Thanks to this arrangement, the first buckle, in forward position, pivots forwards when the first associated backrest is folded down in the same direction as the first backrest whereas the second buckle, placed to the rear of the first buckle, pivots rearwards when the second backrest is folded down.

According to a specific embodiment, a seat pan is installed so as to pivot, on the one hand, on the backrest and, on the other hand, on at least one seat pan link, the seat pan link being intended to be installed so as to pivot on the floor so that the seat pan will move towards the floor when the backrest is placed in folded down position.

BRIEF DESCRIPTION OF THE DRAWINGS

The invention will be more readily understood and other features and advantages will appear on reading the description below, the description making reference to the appended drawings in which.

DETAILED DESCRIPTION OF THE PREFERRED EMBODIMENT(S)

Figure 1:
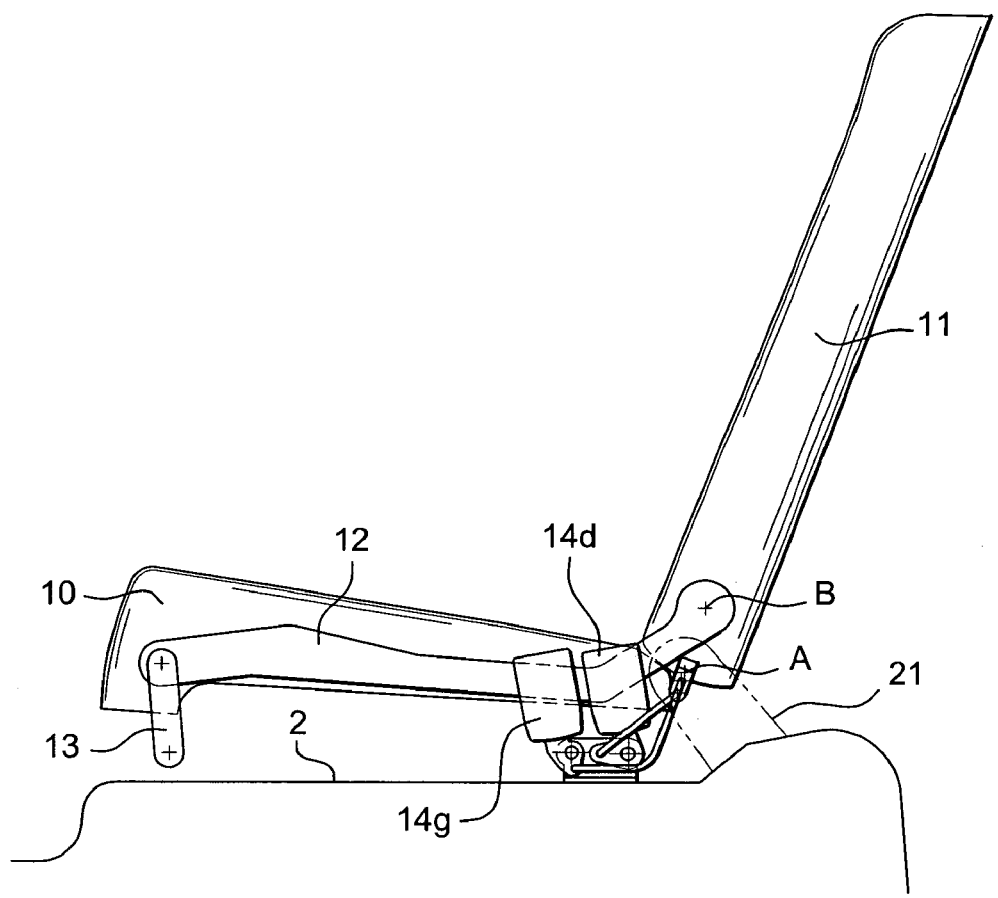
FIG. 1 is a side view of a seat system according to the invention, the backrest being in raised position.
Figure 2:
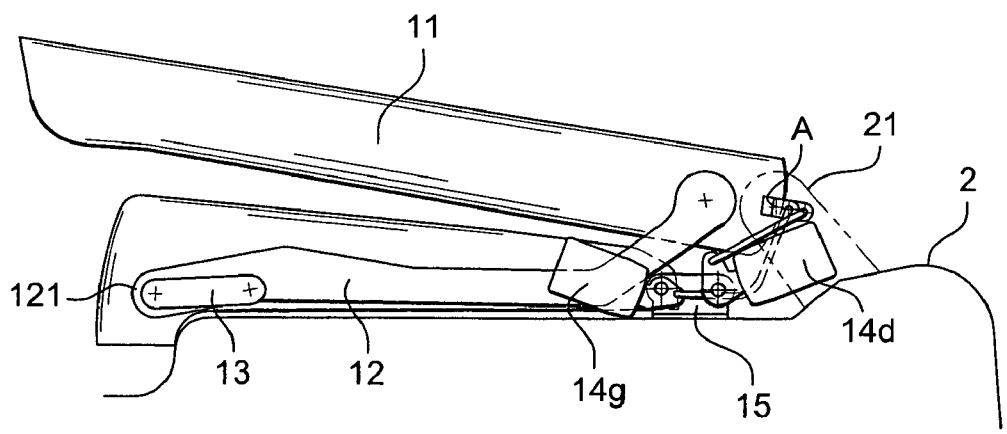
FIG. 2 is a view similar to FIG. 1, with the backrests folded down.

A seat system in compliance with the invention, installed on the floor 2 of a vehicle, comprises two seat parts placed one beside the other on either side of a vertical and longitudinal separation plane P of the vehicle. On FIGS. 1 and 2, a first seat pan and a first backrest are not shown to make the figure clearer. Each part of the seat comprises a more or less horizontal seat pan 10 and a backrest 11 installed so as to pivot around a backrest axis A between a raised position, as shown on FIG. 1, and a folded down position, as shown on FIG. 2. The axis of backrest A is more or less parallel to the floor 2 and is raised above the floor by support yokes 21, shown by chain lines on FIGS. 1 and 2.

Each seat pan 10 is hinged on the floor by the means of two seat pan links 13 installed so as to pivot, on the one hand, on the floor 2 and, on the other hand, at a front end 121 of the seat pan framework 12. Moreover, the seat pan framework 12 is installed so as to pivot on the backrest around a secondary axis B of the backrest 11, parallel to the axis of backrest A, so that the seat pan 10 moves towards the floor when the backrest is placed in folded down position in the manner of a deformable parallelogram the arms of which would be the floor 2, the link 13, the seat pan framework 12 and the backrest 11. Thus, the backrest 11 in folded down position takes up more or less the space of the seat pan 10 in raised position.

Figure 7:
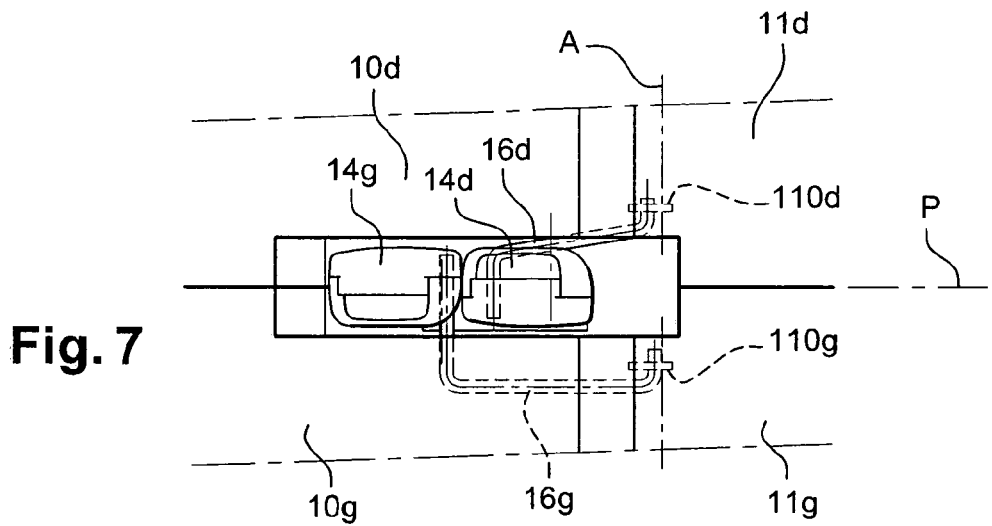
FIGS. 7 to 9 are partial top views of the system of FIG. 1 with, respectively, the two backrests raised, the first backrest folded down and the second backrest raised and the two backrests folded down.
Figure 8:
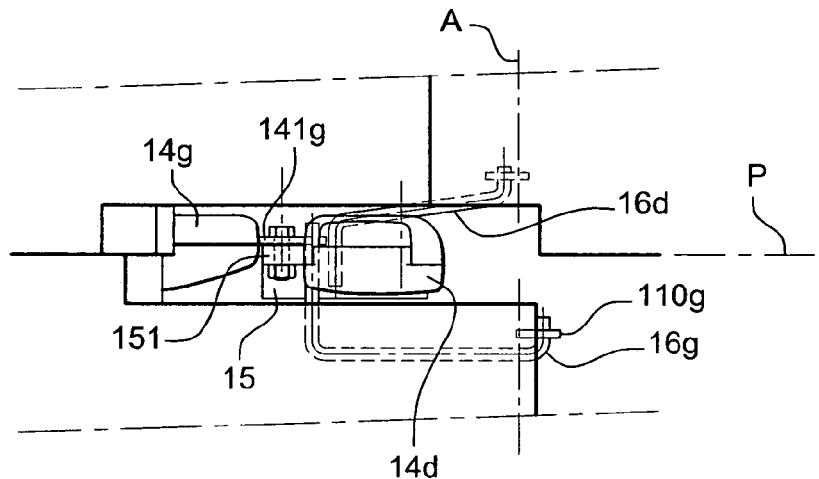
Figure 9:
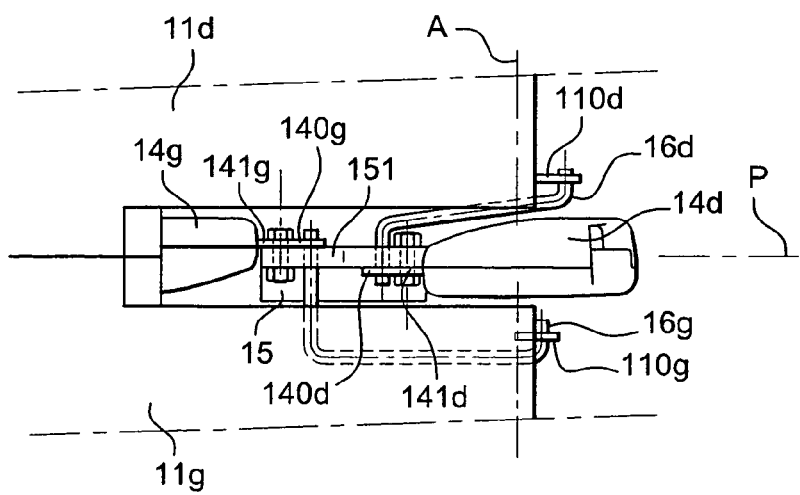

In the remainder of the description, the references of the items of the first part of the seat are suffixed with letter g and the references of the items of the second part by letter d. The seat system moreover comprises two belt buckles 14d, 14g one placed in front of the other in separation plane P. The first buckle 14g, located in the forward position, is intended to accommodate a seat belt ring of the seat to the left of the separation plane (at bottom on FIGS. 7 to 9) whereas the second buckle 14d, located in the rear position, is intended to accommodate a seat belt ring of the seat to the right of the separation plane P. The seat pans 10 and the backrests 11 have cavities to house the buckles between the seats.

A mechanism support 15 in the shape of a square is attached to the floor 12. The buckles 14d, 14g comprise a lug 141d, 141g running along the length of a vertical flange 151 of the square 15 and by which the buckles 14d, 14g are installed so as to pivot on the square 15.

Figure 3:
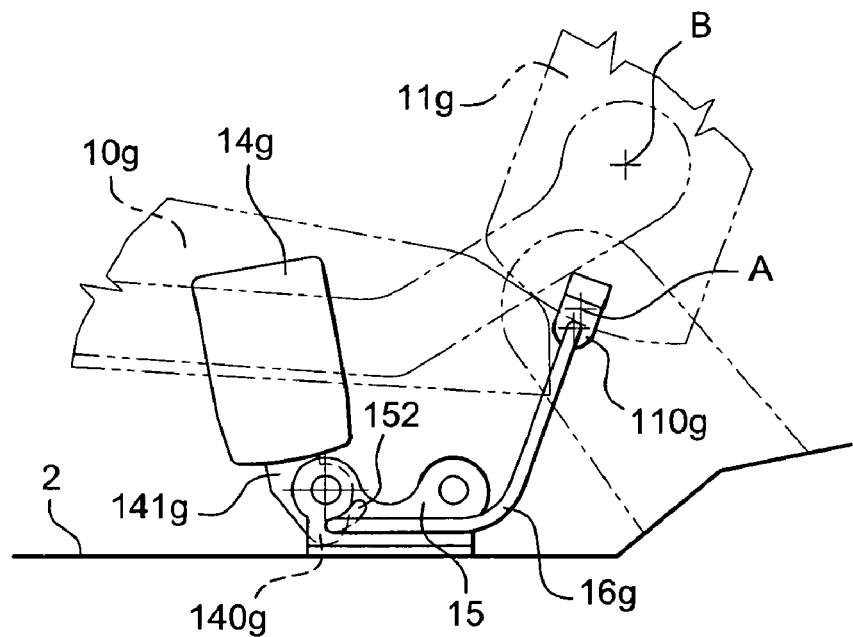
FIG. 3 is a partial view similar to FIG. 1, with a first buckle and a first backrest in raised position.

As shown on FIG. 3, the first backrest 11g, to the left of the separation plane, comprises a first backrest lever 110g protruding downwards when the first backrest 11g is in raised position. A first buckle link 16g is installed so as to pivot on the first backrest lever 110g and on a first buckle lever 140g extending the lug 141g of the first buckle 14g. The first buckle link 16g is elbow shaped to better fit into the space available. It passes through the square 15 by an opening 152 in the form of an arc of a circle. The first backrest lever 110g, the first buckle link 16g and the first buckle lever 140g thus form a U.

Figure 5:
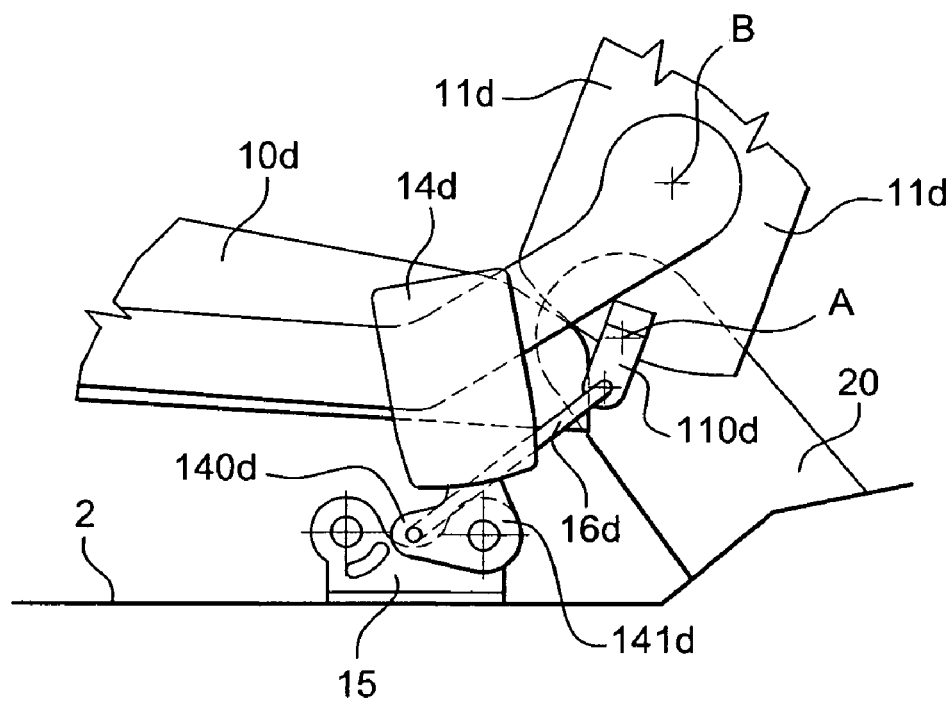
FIG. 5 is a partial view similar to FIG. 1 with a second buckle and a second backrest in raised position.

As shown on FIG. 5, the second backrest 11d, to the right of the separation plane P, comprises a second backrest lever 110d protruding downwards when the second backrest 10d is in raised position. A second buckle link 16d is installed so as to pivot on the second backrest lever 110d and on a second buckle lever 140d extending the lug 141d of the second buckle 14d. The second buckle lever 140d is positioned towards the front so that the line connecting the two hinge axes of the second link 16d is located above the pivoting axis of the second buckle 14d. The second buckle lever 140d, the second link 16d and the second backrest lever 110d thus form a Z.

When the backrests 11g, 11d are in raised position, as shown on FIGS. 1, 3, 5 and 7, the buckles 14d, 14g are more or less parallel and in high position, facing upwards, to be accessible for the seat belt rings not shown. When the backrests 11 are folded down, the seat pans 10 are moved forwards and downwards and the backrests 11 more or less take up the space previously occupied by the seat pans 10.

Figure 4:
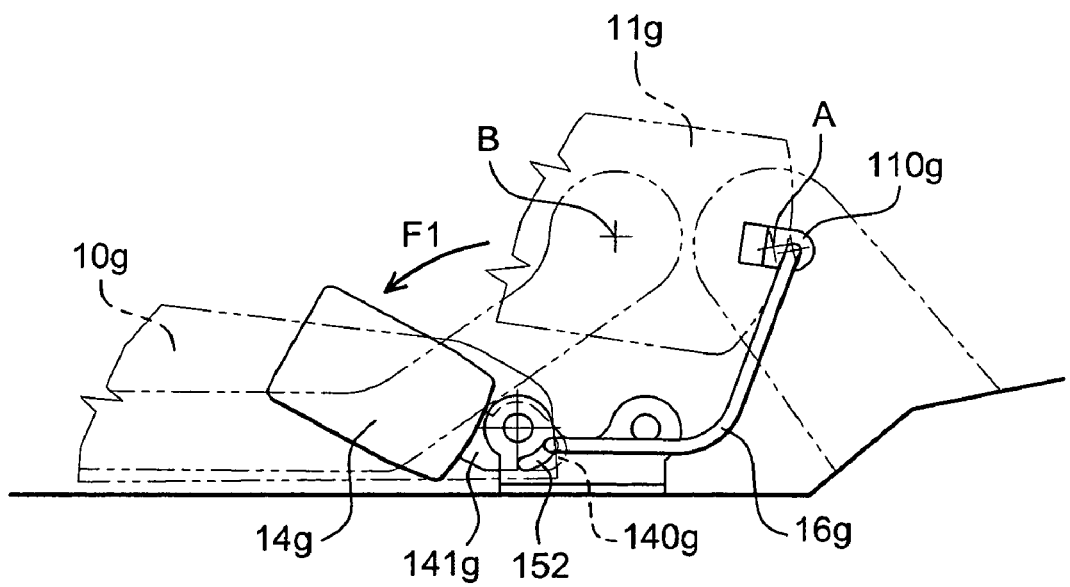
FIG. 4 is a view similar to FIG. 3, the first backrest being in folded down position.

By folding down the first backrest 10g, the first lever 110g moves the first link 16g rearwards. This then moves the second lever 140g of the first buckle 14g also towards the rear which causes the first buckle 14g to pivot forwards in the direction shown by arrow F1 as can be seen on FIG. 4, to a retracted position. This movement is possible, irrespective of the position of the second backrest 11d. Raising the first backrest 11g causes the first buckle 14g to return to its high position as shown on FIG. 3.

Figure 6:
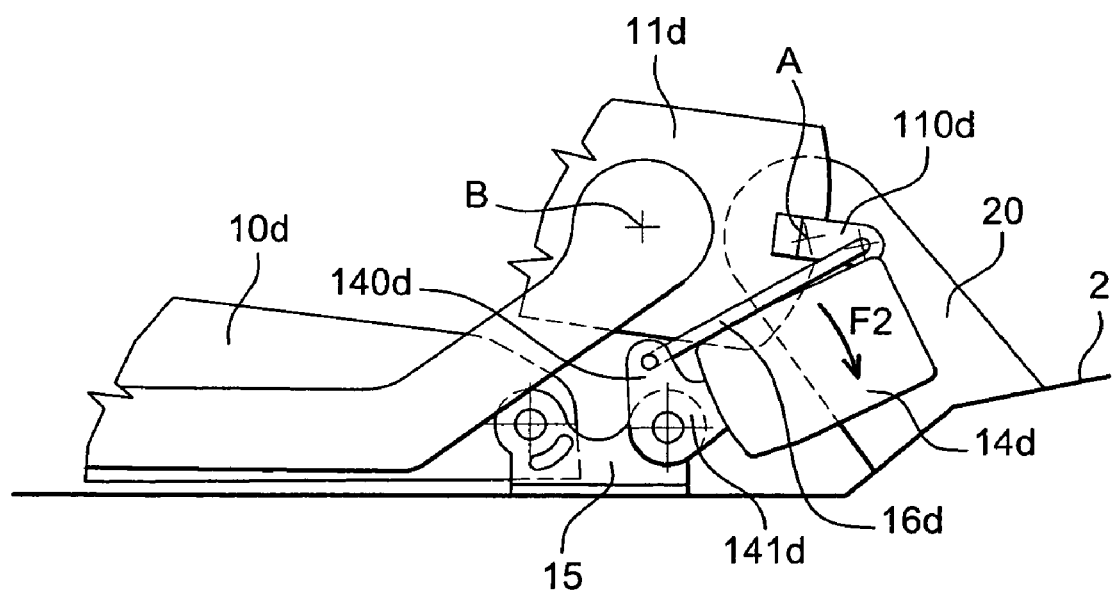
FIG. 6 is a view similar to FIG. 5, the second backrest being in folded down position.

When the second backrest 11d is folded down, the first lever 110d moves the second rod 16d towards the rear. This then moves the second lever 140d of the second buckle 14d also towards the rear which causes the second buckle 14d to pivot towards the rear in the direction shown by arrow F2, as can be seen on FIG. 6, to a retracted position. This movement is possible, irrespective of the position of the first backrest. Raising the second backrest 11d causes the second buckle 14d to return to its high position as shown on FIG. 5.

The invention is not limited to the embodiment described above. Other connecting means could be provided such as wheel or toothed quadrant, pulley and belt and cable systems.

What is claimed is:

1. A seat system comprising:
   a first backrest installed so as to pivot around a backrest axis in relation to a floor between a raised position and a folded down position;
   a first buckle support supporting a first belt buckle and installed so as to pivot to retract the first belt buckle;
   first connecting means between the first backrest and the first buckle support so that the pivoting of the first backrest causes the first belt buckle to pivot between a high position and a retracted position;
   a second backrest installed so as to pivot around the backrest axis and with a raised position in which the second backrest is substantially coplanar with the first backrest, a second buckle support supporting a second belt buckle aligned with the first belt buckle in a plane perpendicular to the backrest axis, the second buckle support being connected to the second backrest by second connecting means in such a manner that the first belt buckle pivots in a first direction when the first backrest pivots from the raised position to the folded down position, and the second belt buckle pivots in a second direction, opposite to the first direction, when the second backrest pivots from the raised position to the folded down position.

2. The system according to claim 1, in which the first connecting means comprises a backrest lever, attached to the first backrest, a buckle lever attached to the first belt buckle and a buckle link connecting the backrest lever and the first belt buckle together.

3. The system according to claim 2, in which the first belt buckle is located further forward than the second belt buckle, said second connecting means includes a second backrest lever, the backrest levers being positioned downwards, the first buckle lever, the first buckle link and the first backrest lever of the first connecting means forming a U, and a second buckle lever, a second buckle link and the second backrest lever of the second connecting means forming a Z.

4. The system according to claim 1, in which a seat pan is installed so as to pivot, on one hand, on the first backrest and, on another hand, on at least one seat pan link, the at least one seat pan link being intended to be installed so as to pivot on the floor so that the seat pan moves towards the floor when the first backrest is placed in folded down position.

* * * * *